United States Patent [19]

Kawai

[11] Patent Number: 5,440,092
[45] Date of Patent: Aug. 8, 1995

[54] WELDING CONTROLLER AND/OR PINCHING FORCE CONTROLLER

[75] Inventor: Shingo Kawai, Nagoya, Japan

[73] Assignee: Nadex Co., Ltd., Nagoya, Japan

[21] Appl. No.: 73,390

[22] Filed: Jun. 9, 1993

[30] Foreign Application Priority Data

Jun. 10, 1992 [JP] Japan ................... 4-177473

[51] Int. Cl.$^6$ ............................................. B23K 11/24
[52] U.S. Cl. ................................ 219/110; 219/86.41
[58] Field of Search ................. 219/109, 110, 86.41

[56] References Cited

U.S. PATENT DOCUMENTS

| | | | |
|---|---|---|---|
| 4,302,653 | 11/1981 | Denning et al. | |
| 4,419,560 | 12/1983 | Zurek | 219/110 |
| 4,456,810 | 6/1984 | Schumacher et al. | 219/110 |
| 4,503,311 | 3/1985 | Houchens et al. | 219/110 |
| 4,694,135 | 9/1987 | Nagel et al. | 219/110 |
| 4,792,656 | 12/1988 | Namiki et al. | 219/110 |
| 4,963,707 | 10/1990 | Zyokou et al. | 219/110 |

FOREIGN PATENT DOCUMENTS 62-18273 12/1981 Japan .

*Primary Examiner*—Clifford C. Shaw
*Attorney, Agent, or Firm*—Dennison, Meserole, Pollack & Scheiner

[57] ABSTRACT

A controller for a welding machine in which workpieces are pinched between a pair of electrodes through which welding current is supplied to weld the workpieces; the controller includes a circuit for detecting an amount of resistance between the electrodes, a circuit for monitoring occurrence of a phenomenon that interelectrode resistance detected by the detecting circuit shifts from an upward tendency to a downward tendency, and a circuit for cutting off welding current after occurrence of the phenomenon monitored by the monitoring circuit, and when an absolute value of a time derivative of the interelectrode resistances detected by the detecting circuit becomes less than the predetermined value.

5 Claims, 11 Drawing Sheets

FIG.10 (a) STARTING INPUT
FIG.10 (b) PRESSING FORCE
FIG.10 (c) WELDING CURRENT
FIG.10 (d) SMALL CURRENT
FIG.10 (e) INTERELECTRODE RESISTANCE

WELDING CONTROLLER AND/OR PINCHING FORCE CONTROLLER

BACKGROUND OF THE INVENTION

1. Field of the Invention

The present invention relates to a controller for a welding machine in which workpieces are pinched between a pair of electrodes through which welding current is supplied to the workpieces to cause the workpieces to be heated and welded.

2. Description of the Prior Art

In such a type of a welding machine, a cut-off timing of welding current must be properly controlled. An earlier setting of the timing may cause insufficient welding, whereas a later setting of the timing may cause welding time to be unnecessarily prolonged, resulting in that productivity is lowered, the electrodes are excessively worn, and welding strength and welding appearance are degraded due to occurrence of spattering. To comply with the problem, Japanese Patent Publication No. 62-18273 discloses a technique in which welding current is contrived to be cut off when $\Delta R$ reaches a predetermined value. Here, $\Delta R$ equals R(MAX)-R(PRESENT) where R(MAX) shows the maximum value of the interelectrode resistance during welding and R(PRESENT) shows a present value of the interelectrode resistance. The interelectrode resistance has a tendency to increase one time and decrease thereafter, since it increases with rise in the workpiece temperature and decreases with growth of nugget. Therefore, in Japanese Patent Publication No. 62-18273, welding current is cut off when the present resistance value R(PRESENT) decreases by the predetermined amount from the maximum resistance value R(MAX), judging that nugget has grown up.

According to the prior arts, a decreased amount of resistance, namely a predetermined value regarding $\Delta R$, is required. In this case, of course, the predetermined value on the decreased amount of the resistance must be changed in correspondence with variations in, for example, material, thickness, number, coating layer or others of the workpieces.

Therefore, a proper reference value on the decreased amount of the resistance must be experimentally obtained or calculated for each welding condition of the welding machine, causing a substantial burden to a user, manufacture or dealer of such a welding machine. Particularly in these days, as workpieces have a tendency of variously changing in material, thickness, coating layer or others, determination of a reference value for each welding condition has caused a considerable burden.

In order to meet various conditions, reference values corresponding to respective welding conditions must be stored, causing requirement of a large memory as well as complicated operation for controlling it which may disadvantageously degrade facility of the machine.

Even if the workpieces are uniform, repeated welding operation may cause changes with time such as increase of diameter of the electrodes, and process for correcting such a change must be preliminarily prepared for each welding condition.

SUMMARY OF THE INVENTION

It is an object of the present invention to provide a novel welding controller in which no definition of optimum or reference values for each welding condition is required, and consequently a welding operator is relieved from inputting operation in response to any change of welding conditions.

To achieve this object, the present invention provides a controller for a welding machine in which workpieces are pinched between a pair of electrodes through which welding current is supplied to weld the workpieces. The welding controller comprises means for detecting an amount of resistance between the electrodes, means for monitoring occurrence of a phenomenon that interelectrode resistance detected by the detecting means shifts from an upward tendency to a downward tendency, means for cutting off welding current after occurrence of the phenomenon is monitored by the monitoring means, and when an absolute value of a time derivative of the interelectrode resistances detected by the detecting means becomes less than the predetermined value.

As described hereinafter, the predetermined value may be a constant or a value calculated in every welding step.

According to the present invention, welding current is cut off after nugget begins to grow up, and when the absolute value of the time derivative of the interelectrode resistance becomes less than the predetermined value, that is when changing speed of the interelectrode resistance becomes less than the predetermined value. The cut-off timing of the welding current is a saturation period when the welding is substantially completed. A good welding result may be obtained when welding current is supplied up to the timing and is cut off at the timing.

Thus, in the present invention, a predetermined value can be set independent of the respective welding conditions, since not resistance but time derivative of the resistance is selected as a parameter.

DETAILED DESCRIPTION OF THE PREFERRED EMBODIMENTS

First Embodiment (Adjustment of welding current and adjustment of welding time)

Figure 1:
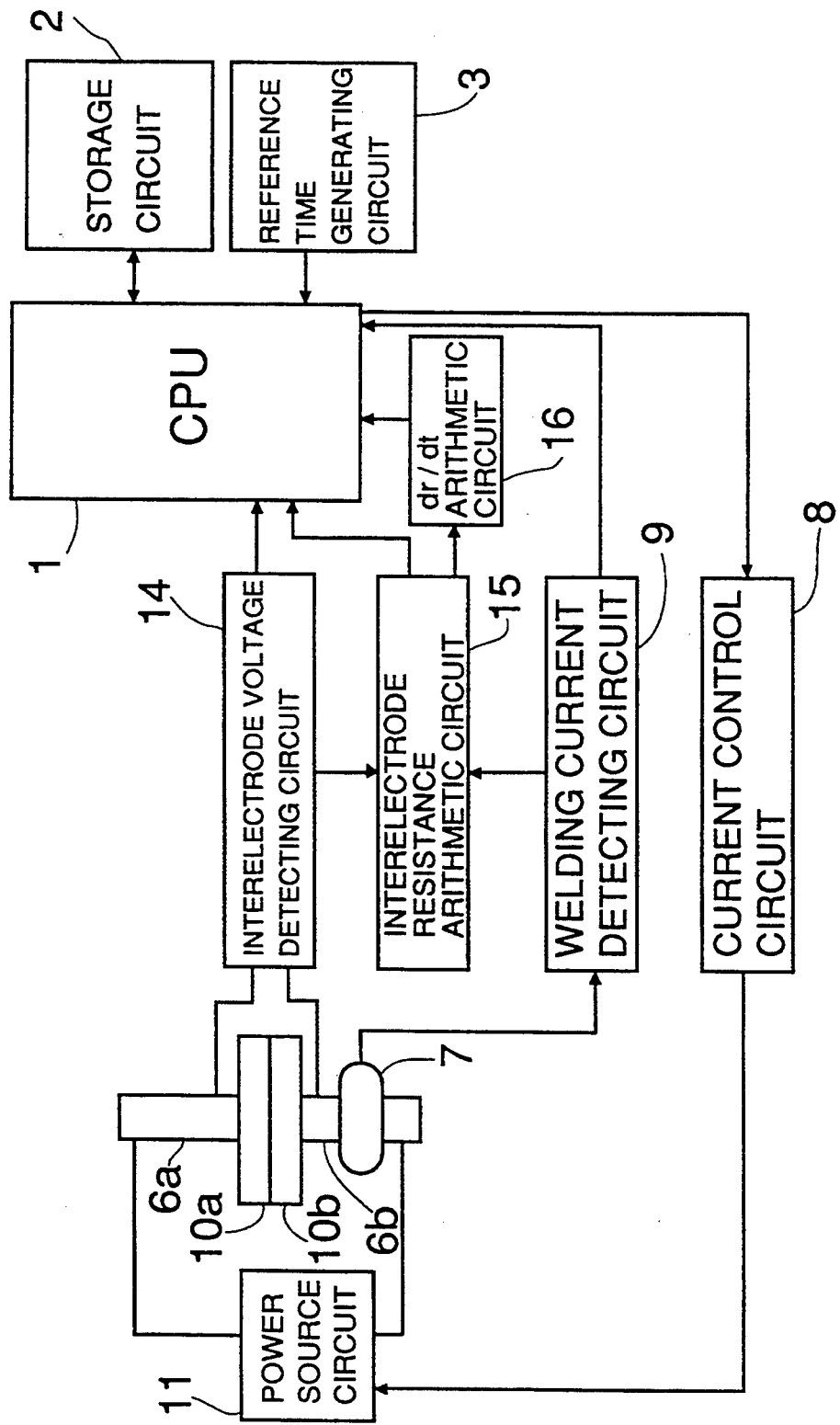
FIG. 1 is a block diagram showing a system configuration of a controller for a welding machine according to a first embodiment of the present invention.

FIG. 1 shows a system configuration of a first embodiment, in which workpieces 10a, 10b are pinched between a pair of electrodes 6a, 6b and are supplied with welding current from a power source circuit 11. The amperage of welding current is adjustable through a current control circuit 8. The current control circuit 8 is controlled by a central processing unit (CPU) 1 so as to adjust welding current to the amperage directed by CPU 1.

Interposed between the electrodes 6a, 6b is a detecting circuit 14 for detecting interelectrode voltage, and the detected value by the detecting circuit 14 is inputted to the CPU 1. Attached to one of the electrodes, in this case 6b, is a current detector 7 whose detection signal is sent to a welding current detecting circuit 9. The detected value by the circuit 9 is inputted to the CPU 1. Detection signals from the voltage detecting circuit 14 and the current detecting circuit 9 are sent to an arithmetic circuit 15 for computing interelectrode resistance, and a signal thus obtained for indicating interelectrode resistance is inputted to the CPU 1. The signal thus obtained for indicating interelectrode resistance is further inputted to a circuit 16 adapted for differentiating interelectrode resistance, and a signal corresponding to the time differentiated value is inputted to the CPU 1.

Figure 4:
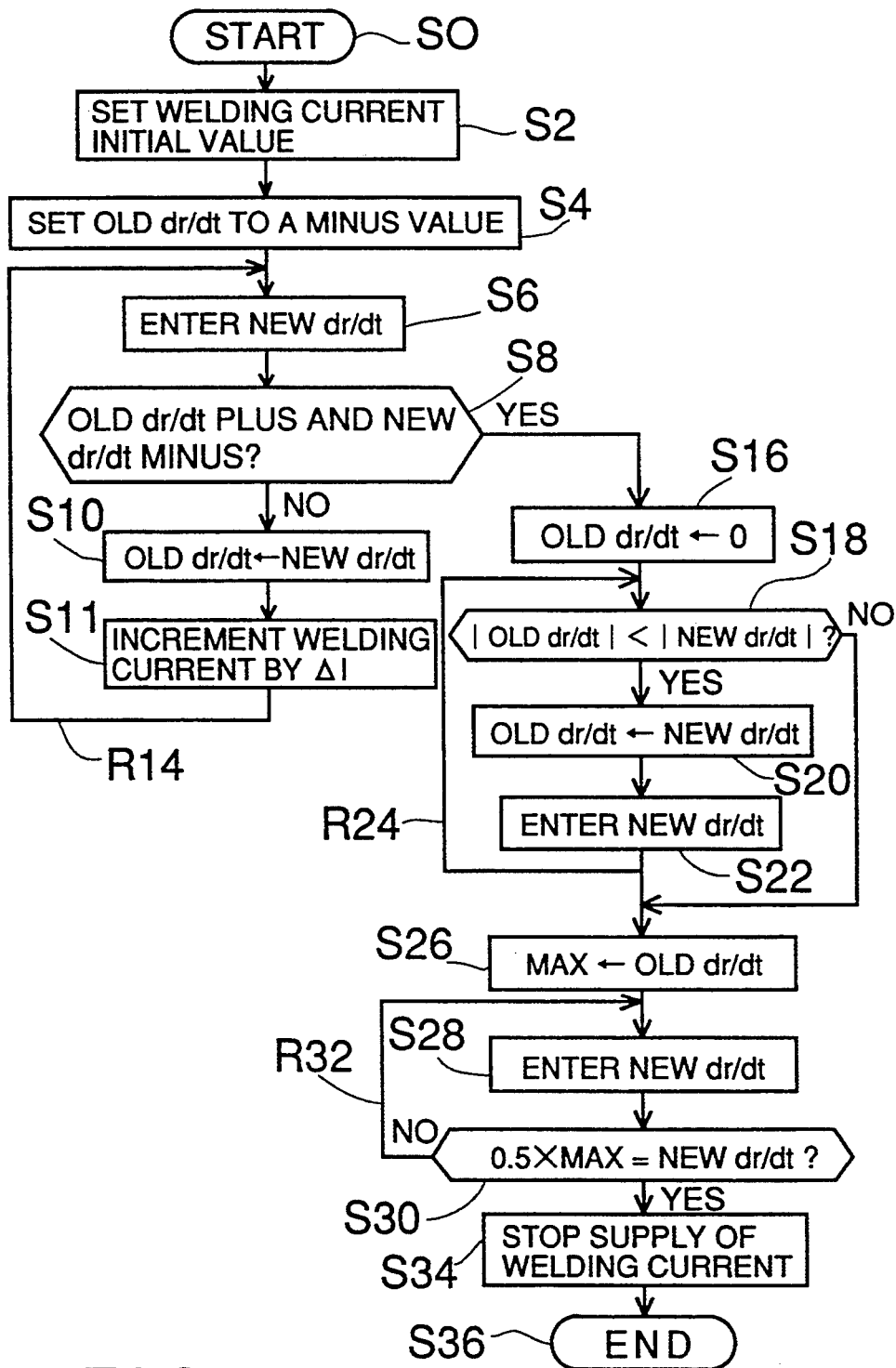
FIG. 4 is a flow chart of a procedure of the first embodiment.

The CPU 1 is connected with a circuit 2 for storing a program to be used for executing a procedure shown in FIG. 4 and a circuit 3 for generating a pulse every reference period of time. Though interelectrode resistance is calculated from voltage and current in this embodiment, such resistance may be calculated from current only, on condition that interelectrode voltage is constant.

Figure 2:
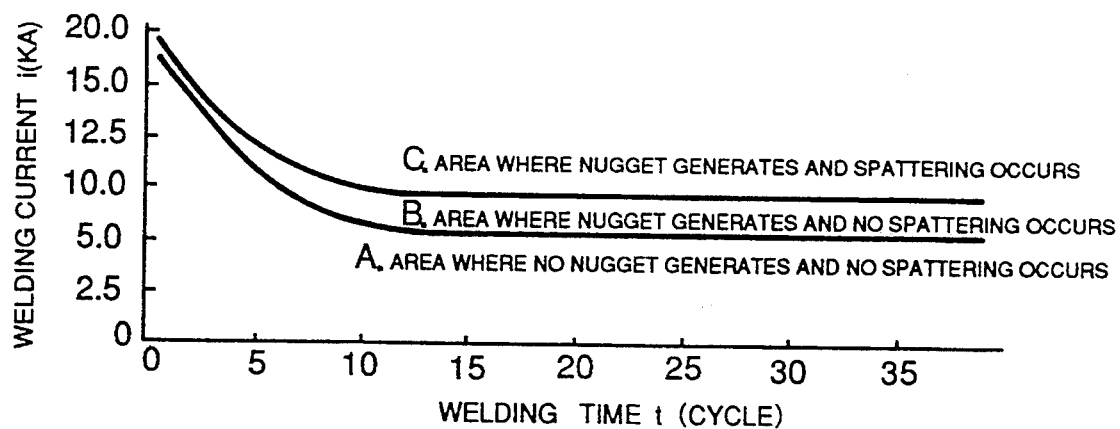
FIG. 2 is a graph illustrating a proper value area of welding current.

FIG. 2 shows a proper area of welding current and welding time. In an area A, welding current is insufficient, causing no spattering and no nugget. On the contrary, in an area C, welding current is excessive, permitting not only generation of nugget but also occurrence of spattering which will cause insufficient welding strength and poor appearance of the welded portion. An area B is a proper area in which nugget is generated but no spattering occurs.

Figure 3:
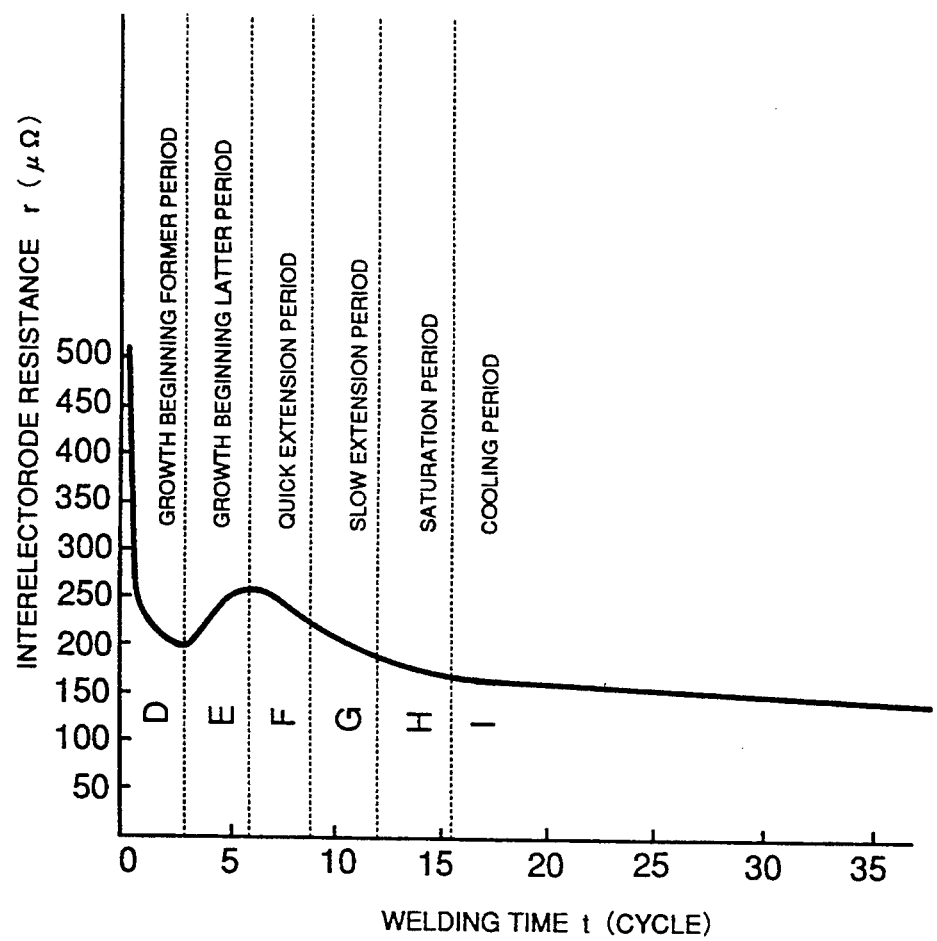
FIG. 3 is a graph illustrating the relationship between the progress of welding and change of interelectrode resistance.

It is known that, if welding current is supplied under the proper condition in the area B, interelectrode resistance changes in progress of welding as shown in FIG. 3.

There is a growth beginning former period just after beginning of power supply. In this period, resistance decreases due to reduction of contact resistance of the workpieces. This former period is followed by a growth beginning latter period. In this latter period, resistance increases due to rising of temperature of the workpieces. The latter period is followed by a quick extension period, in which nugget grows up quickly with prompt reduction of resistance. Thereafter, resistance is gradually lowered at a lowering speed which is slowly reduced, until it finally reaches a substantially constant value. This stage is performed in a slow extension period, a saturation period and a cooling period.

FIG. 4 shows a flow chart of the procedure which is executed by the CPU 1 in accordance with the program stored in the storage circuit 2.

At first, when welding is started in Step S0, an initial value of welding current begins to flow in Step S2. The initial value is indicated by Io in FIG. 5(a) and set to be a value low enough to prevent beginning of welding of workpieces which can be welded with a minimum amperage. Then, a previous time derivative of resistance (old dr/dt) is set to a minus value as an initial value in Step S4. Then, in Step S6, a current time derivative is entered to be used as a new dr/dt.

Figure 5:
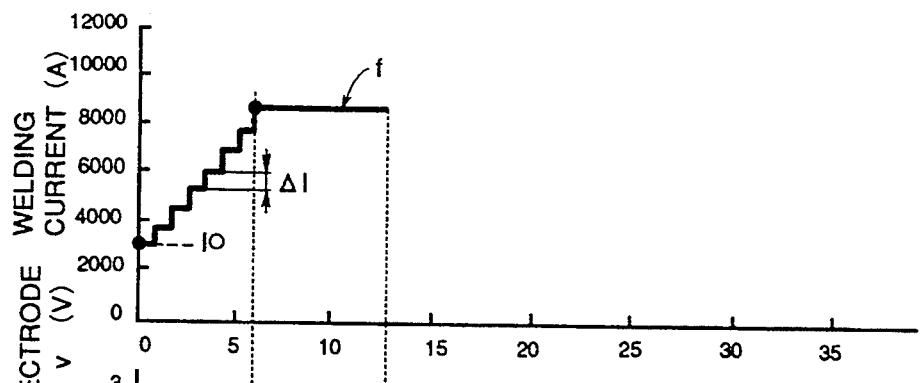
FIGS. 5(a) to 5(d) are graphs illustrating the operation of the first embodiment.
Figure 5:
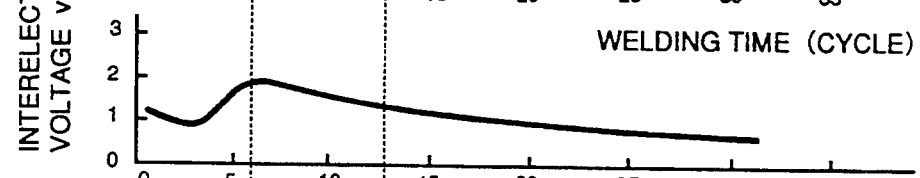
Figure 5:
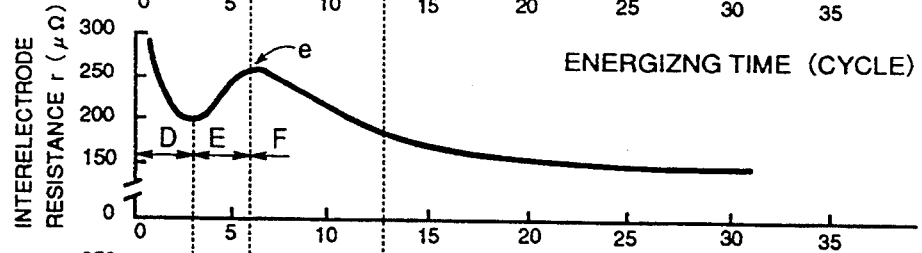
Figure 5:
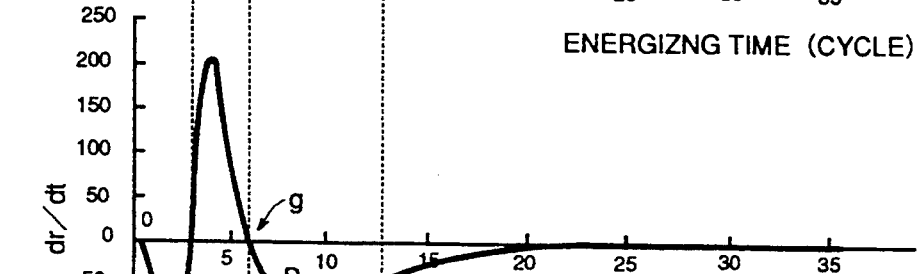
Figure 5:
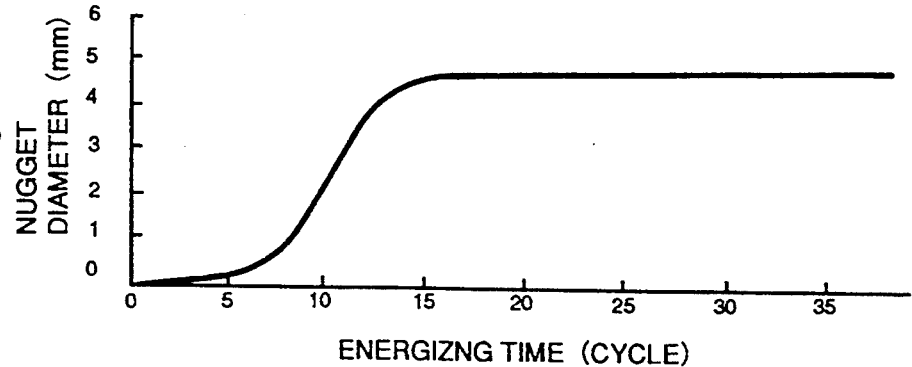

In Step S8, the CPU 1 discriminates whether the previous rate of change of resistance (old dr/dt) is a plus value and the current rate of change of resistance (new dr/dt) is a minus value or not. Specifically, the CPU 1 discriminates whether there occurs a phenomenon that resistance has increased but begins to decrease at this time or not. As shown in FIG. 5(c), resistance usually decreases just after beginning of power supply, that is, old and new values of dr/dt are minus values, and the CPU 1 discriminates as "no" in Step S8. In this case, the rate of change of resistance is updated in Step S10, and welding current incremented by ΔI in Step S11, and then control returns to Step S6 (loop R14). Consequently, the welding current I is incremented by ΔI, as shown in FIG. 5(a). As the temperature of the workpieces rises along with increment by ΔI, the resistance begins to increase. Specifically, dr/dt changes from minus to plus, as shown in FIG. 5(d) and thereafter is kept plus. As the CPU 1 continues to discriminate as "no" in Step S8 in this period, the amperage of welding current is kept to be incremented by ΔI.

The welding current is incremented by ΔI, until nugget begins to grow up, when the resistance shifts from an upward tendency to a downward tendency at a point e in FIG. 5(c). Specifically, dr/dt changes from plus to minus at a point g in FIG. 5(d). At this time, the CPU 1 discriminates as "yes" in Step S8. In case of "yes" in Step S8, Step S11 is skipped. Consequently, welding current is maintained at the amperage thereafter, as shown by f in FIG. 5(a). The amperage of welding current thus maintained is a minimum value which permits growth of nugget, neither excessive not insufficient.

Thus in this embodiment, Step S8 constitutes means for monitoring occurrence of the phenomenon that the interelectrode resistance shifts from an upward tendency to a downward tendency, and after the CPU 1 discriminates as "yes" in Step S8, Step S11 is skipped, and this process constitutes current adjusting means which keeps welding current incremented before occurrence of the phenomenon and maintains it constant thereafter. In this embodiment, welding current is maintained constant by skipping Step S11. Though actual measurement of welding current will show slight fluctuation thereof due to fluctuation of power source, substantially satisfactory welding result is achievable. Specifically, strict maintenance of welding current is not required, but substantial maintenance is allowable.

When interelectrode resistance shifts from an upward tendency to a downward tendency, or when nugget begins to grow up and welding proceeds to the quick extension period in FIG. 3, the old rate of change (old dr/dt) is initialized to zero in Step S16 (This is an artificial process for detecting a peak value of dr/dt). Then, the absolute value of old dr/dt and new dr/dt are compared in Step S18. As the absolute value of the rate of change of resistance (dr/dt) increases in the period F in FIG. 5(d), that is in the quick extension period, the CPU I discriminates as "yes" in Step S18. In this case, old dr/dt is updated in Step S20, and new dr/dt is updated in Step S21. While the absolute value of the rate of change of resistance (dr/dt) continues to increase, that is, in the quick extension period as shown by F in FIG. 5(d), the above process is repeated (loop R24 in FIG. 4), and welding current is maintained at the amperage at the beginning of growth of nugget.

The quick extension period of nugget is followed by a slow extension period in which the absolute value of the rate of change of resistance dr/dt begins to decrease, as shown in FIG. 5(d). At this time, the CPU i discriminates as "no" in Step 18 in FIG. 4, and a next step S26 is executed. In Step S26, the rate of change of resistance at the beginning of decrease of the absolute value (old dr/dt or a peak value of the rate of change shown by a point P in FIG. 5(d)) is stored as MAX.

Steps S28 and S30 in FIG. 4 are repeatedly executed to repeat a loop R32, until the absolute value of the rate of change reaches 50% of the peak value MAX. When the absolute value of the rate of change decreases to 50% of the peak value, CPU discriminates as "yes" in Step S30, and supply of welding current is stopped in Step S34. Specifically, the amperage of welding current at the beginning of growth of nugget is maintained, until the absolute value of the rate of change reaches 50% of the peak value, and thereafter supply of welding current is stopped, as shown in FIGS. 5(a) and 5(d). It is experimentally known that the timing when the absolute value of the rate of change of resistance reaches 50% of the peak value corresponds to the saturation period in FIG. 3, and it is also known that supply of welding current up to the timing assures substantially completed welding. Welding may be stopped, when dr/dt becomes less than a certain minute value. As it is also known that dr/dt at the timing when welding is substantially completed is a minute value, irrespective of material, thickness or others of workpieces, welding can be stopped at a proper timing in this way, irrespective of the welding conditions.

In this embodiment, welding current is adjusted in accordance with the timing when resistance shifts from an upward tendency to a downward tendency (which corresponds to the timing of the rate of change shift from plus to minus), so that there is no need of preliminarily defining any reference value. As welding time is adjusted in accordance with the timing when the rate of change of resistance reaches 50% of the peak value, there is no need of preliminarily defining any reference time. As the above phenomenon is commonly adaptable, irrespective of material, thickness, number or others of workpieces, the same program is adaptive to wide-range welding conditions, eliminating troublesome switching of programs or reference values by an operator.

Second Embodiment (Adjustment of pinching pressure)

Figure 6:
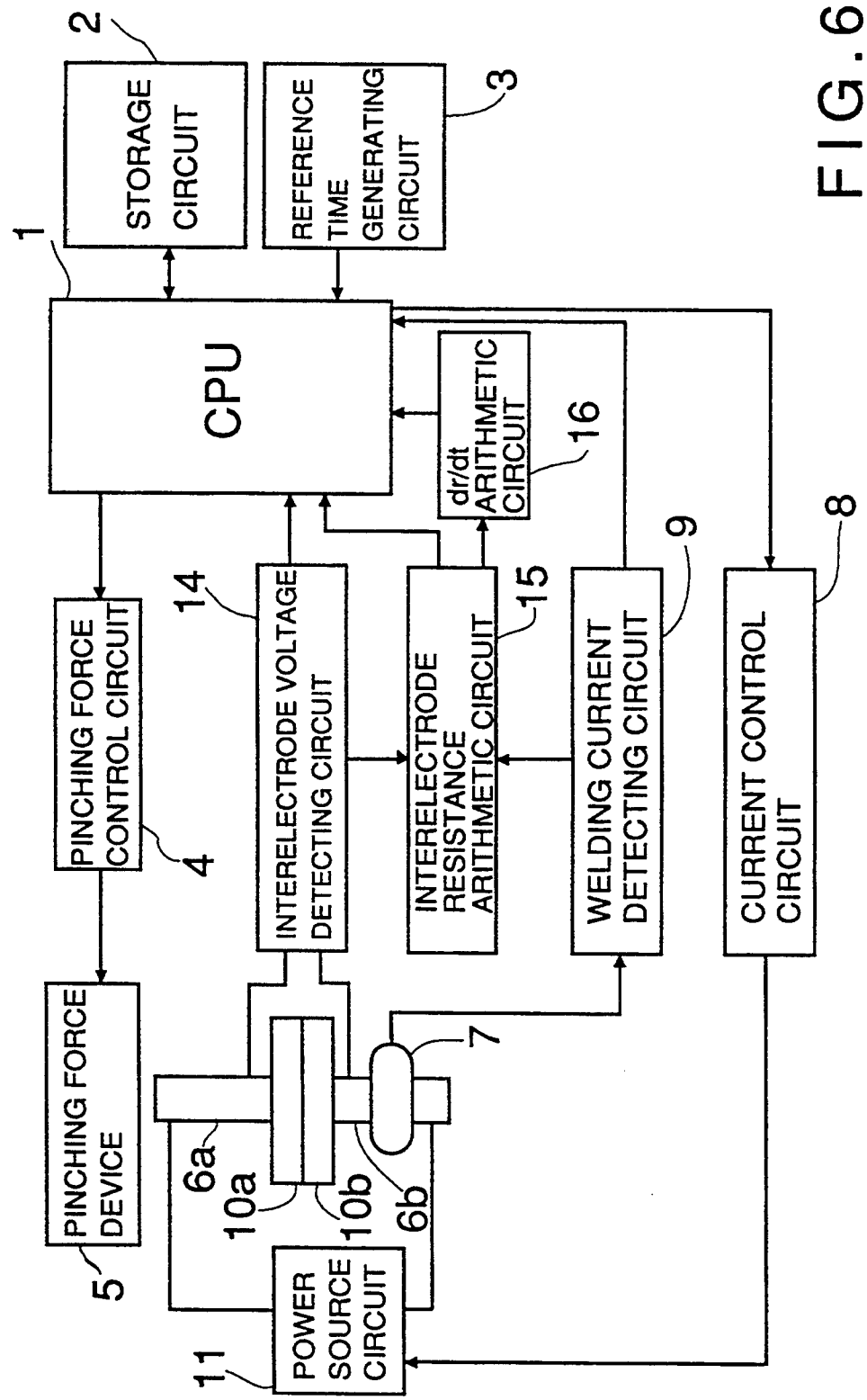
FIG. 6 is a block diagram showing a system configuration of the controller according to a second and a third embodiment.

FIG. 6 shows a system configuration of a second embodiment. This embodiment is different from the first embodiment in that a pinching pressure device 5 and a device 4 for control pinching force are added. The pinching force control device 4 controls pinching force of the pinching force device 5 so as to conform with a value indicated by the CPU 1.

In this embodiment, after pinching force reaches a proper value, welding current for assuring proper progress of welding is previously supplied. Then, pinching force is incremented, until the rate of change of resistance dr/dt changes from plus to minus, that is, resistance shifts from an upward tendency to a downward tendency in the same way as the loop R14 in which Steps S6 to S12 in FIG. 4 are repeated. For this purpose, Step S11 in FIG. 4 is replaced by a process of "incrementing pinching force by ΔP". In this embodiment, pinching force is maintained at the value at beginning of growth of nugget. As the pinching force is neither excessive nor insufficient, welding can be carried out with pinching force kept at the proper value. Preliminarily definition of a reference value as to pinching force is not required in this embodiment, either.

Third Embodiment (Adjustment of welding current and pinching force)

This embodiment includes the same system configuration as that of the second embodiment shown in FIG. 6. In this embodiment, Step S11 in FIG. 4 is replaced by a process of "incrementing welding current by ΔI and incrementing pinching force by ΔP". Consequently, both of welding current and pinching force increase, until nugget begins to grow up, and thereafter they are maintained at the amperage of welding current and the pinching force at the beginning of growth of nugget is maintained, so that welding can be carried out with the both maintained properly.

Fourth Embodiment (Improvement of the third embodiment)

Figure 7:
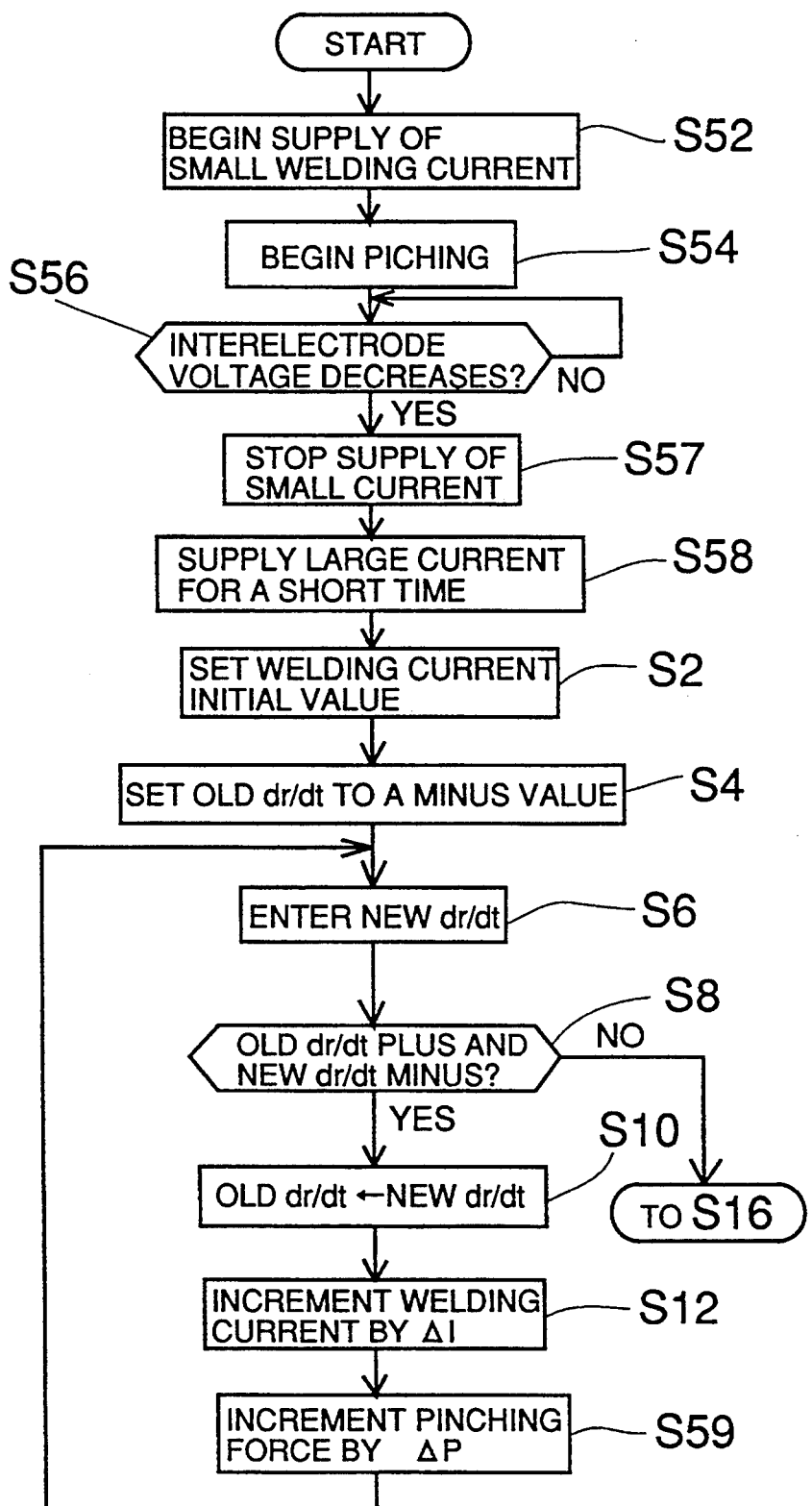
FIG. 7 is a flow chart of a procedure of a fourth embodiment.
Figure 8:
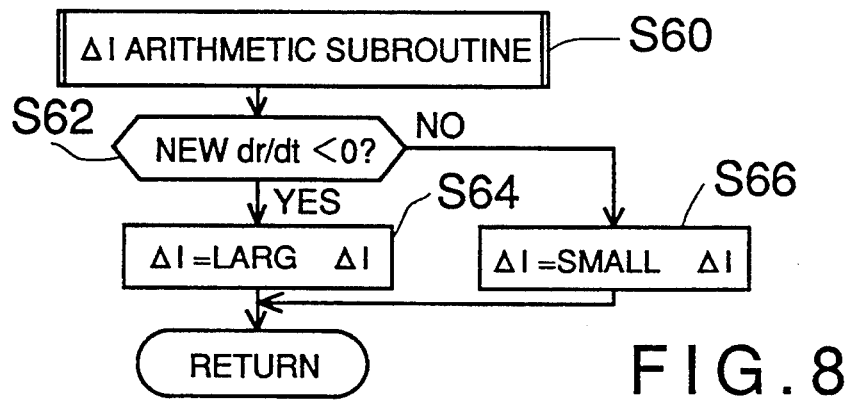
FIG. 8 is a flow chart of a procedure for determining an increment of welding current in the fourth embodiment.

This embodiment includes the system configuration as shown in FIG. 6, and the procedure is improved as shown in FIGS. 7 and 8, providing the following characteristics.

(Automated Pinching)

Figure 10:
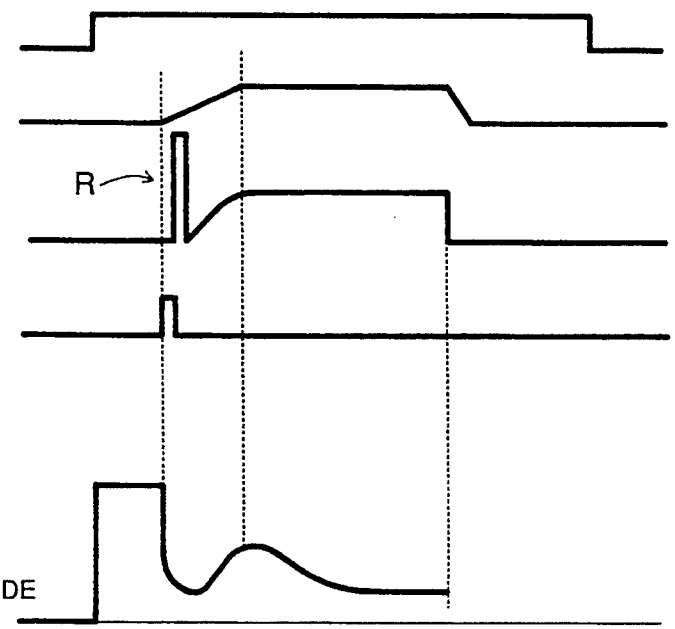
FIGS. 10(a) to 10(d) are diagrams illustrating the operation of the fourth embodiment.

Referring to FIG. 7, when start of welding is indicated, small current is prepared to flow between the electrodes in Step S52. At first, as the electrodes are apart from each other and the workpieces are not yet pinched therebetween, no current flows actually. Then, the distance between the electrodes begins to be reduced in Step S54. When the distance between the electrodes is reduced enough to pinch the workpieces therebetween, small current flows, as shown in FIG. 10(d), and consequently interelectrode resistance decreases. Specifically, when the CPU 1 discriminates as "yes" in Step S56, it is known that the workpieces are pinched between the electrodes.

(Short Time Supply of Large Current)

Just after the workpieces are pinched between the electrodes, a large welding current is supplied for a short period of time (See R in FIG. 10(c)). The large welding current is set to such an amperage as to cause the resistance component of the surface coating layer to be extinguished and to prevent occurrence of spattering.

As supply of the large current causes the resistance component of the coating layer to be extinguished, welding current and welding time are adjusted to optimum values in the same process as that in the third embodiment. Specifically, there is no possibility that resistance component of the coating layer would interfere with optimum adjustment of welding current and welding time.

(Adjustment of the Rate of Increase of Welding Current)

In this embodiment, increment ΔI of current used in Step S12 in FIG. 7 is determined as shown in FIG. 8. In Step S62, the CPU 1 discriminates whether the rate of change of resistance dr/dt is plus or minus to discriminate whether welding progress is in the period S or T. If welding progress is in the period S and dr/dt is minus, the increment ΔI is set to a large value LARGΔI in Step S64. As a result, welding current promptly increases, as shown in the period S in FIG. 11(a). This allows the time required for the process of searching an optimum of welding current to be reduced.

Figure 11:
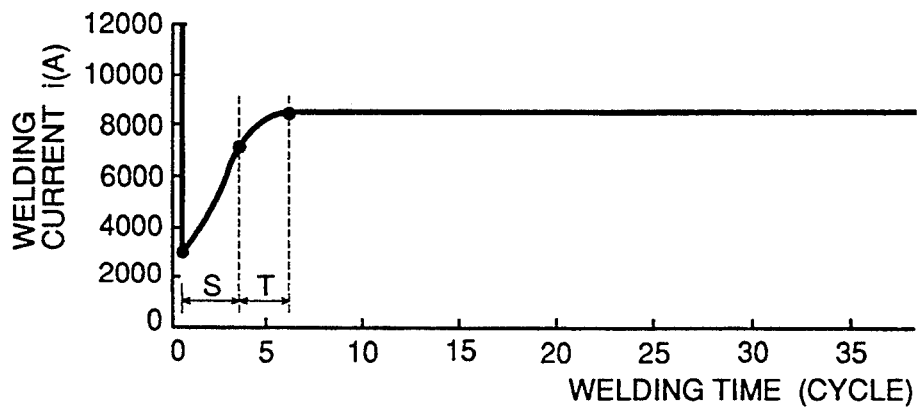
FIGS. 11(a) to 11(d) are graphs illustrating the operation of the fourth embodiment.
Figure 11:
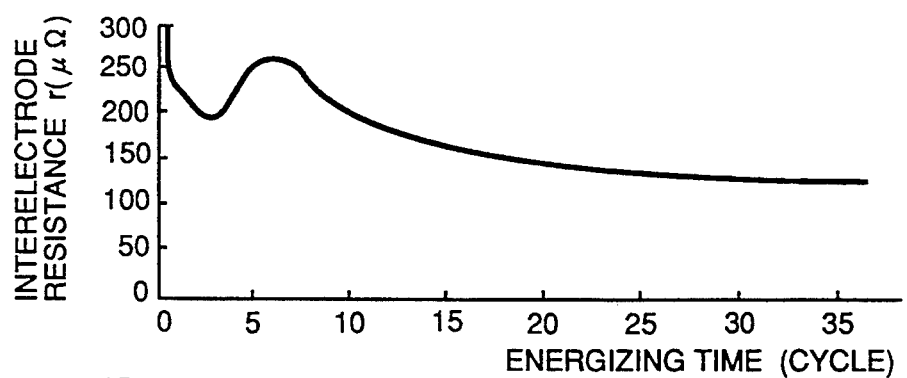
Figure 11:
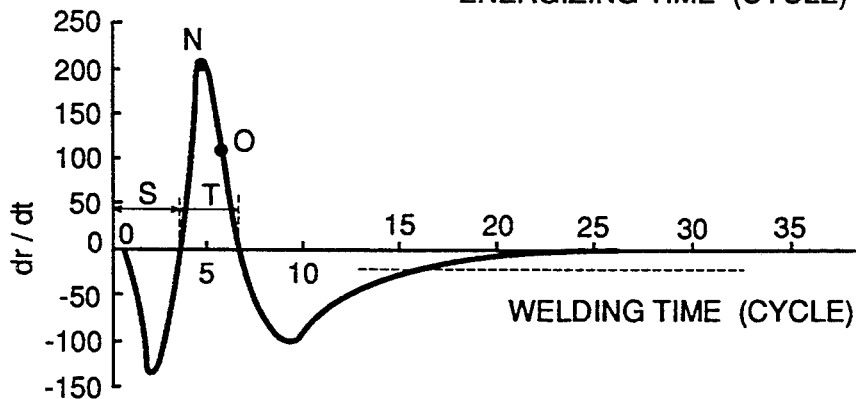
Figure 11:
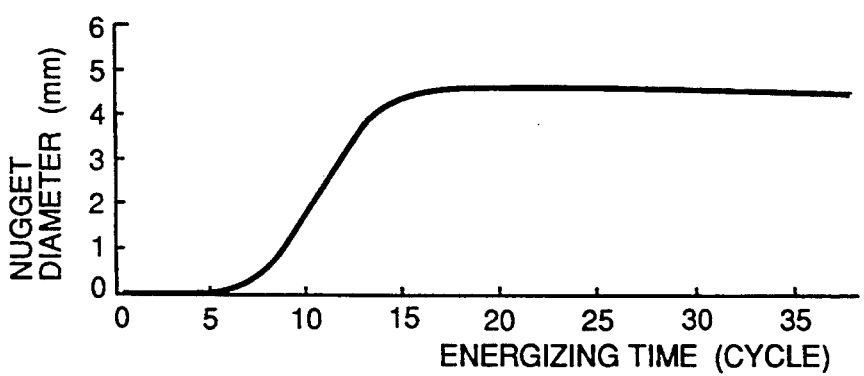

When welding proceeds to the period T of FIG. 11(c), dr/dt becomes plus. In this case, the increment ΔI is set to a small value SMALLΔI in Step S66 in FIG. 8. As a result, welding current slowly increases, as shown in the period T in FIG. 11(a). This allows welding current to be correctly adjusted to an optimum.

Figure 9:
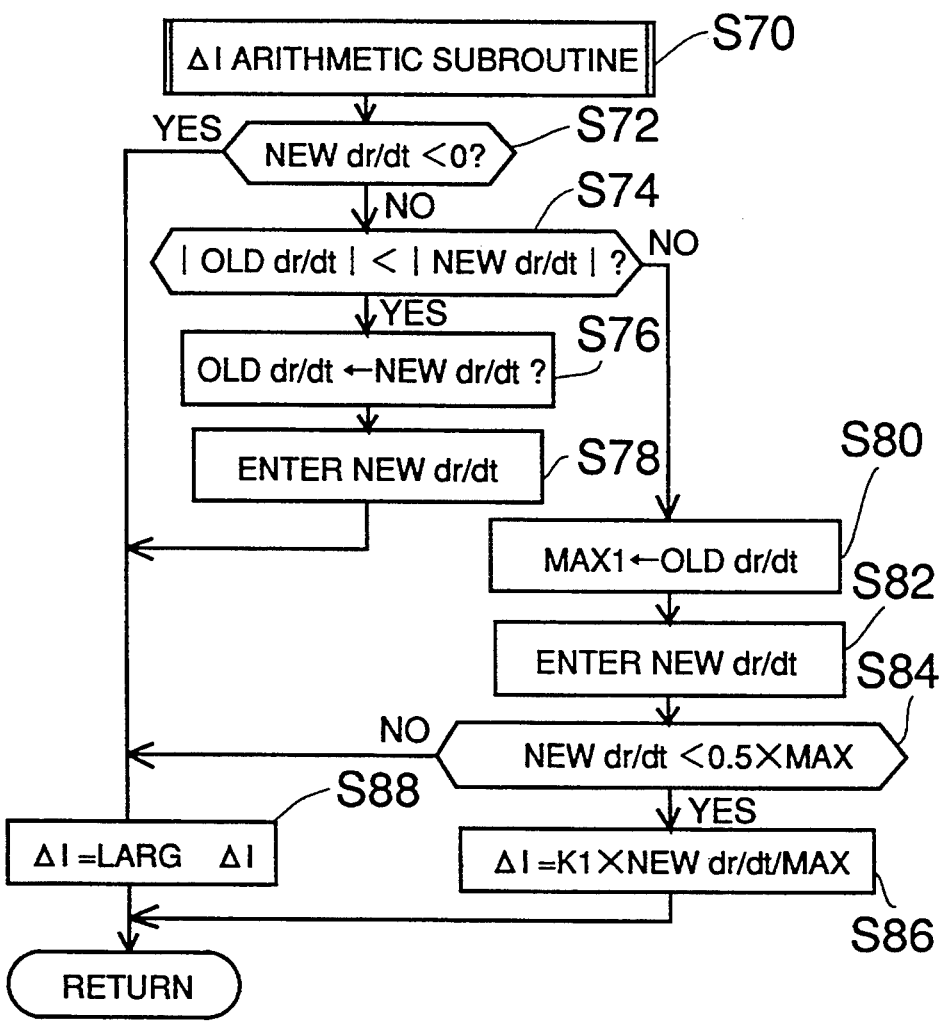
FIG. 9 is a flow chart of another procedure for determining an increment of welding current in the fourth embodiment.

The increment ΔI of welding current may be determined in accordance with a procedure as shown in FIG. 9. In this case, Steps S72 and S88 are provided to set the increment ΔI to the maximum LARGΔI, while dr/dt is a minus value, that is, in the period S. Then, Steps S74 to So S78 are used to keep the maximum increment LARGΔI, while the rate of change increases, that is, until a timing N in FIG. 11(c). The process from Step S84 to Step S88 allows the maximum increment LARG ΔI to be kept, until the rate of change reaches 50% of the peak value, that is, until a timing 0 in FIG. 11(c). After the timing 0, the increment ΔI decreases in correspondence with decrease of dr/dt in Step S86.

This embodiment uses the maximum increment ΔI within such a wide range as to prevent degradation of control precision, permitting substantial reduction of time required for adjustment. Completion of welding is determined in such a manner as described with respect to the first embodiment, and any detailed description will be omitted.

Fifth Embodiment

Figure 12:
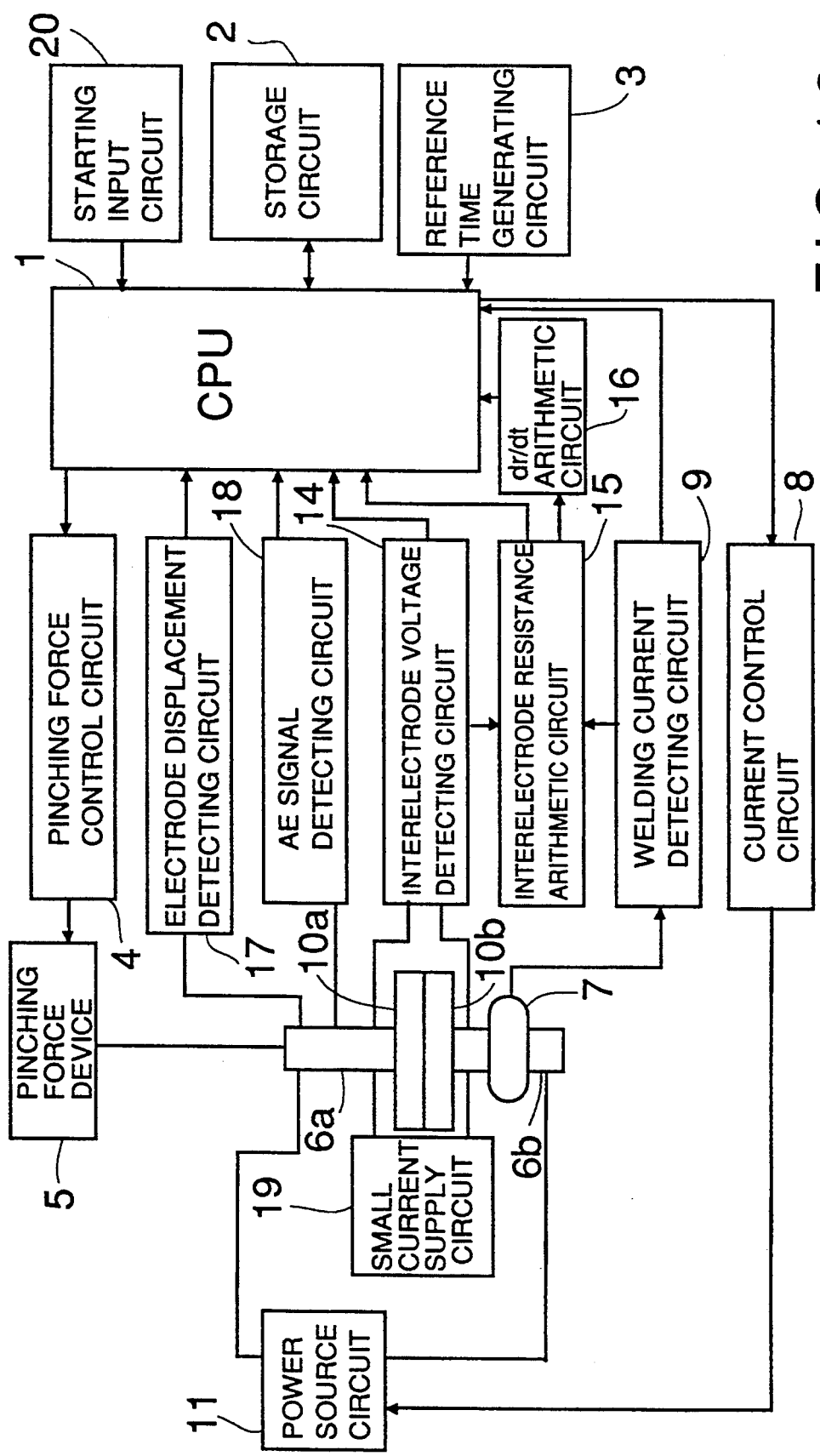
FIG. 12 is a block diagram of a system configuration of a fifth embodiment.

A fifth embodiment has a system configuration as shown in FIG. 12. This system is additionally provided with a circuit 17 for detecting an amount of displacement of the electrode 6a (amount of displacement of the position of the electrode 6a caused by progress of welding after beginning of application of pinching force) and a circuit 18 for detecting an acoustic emission (AE) signal, and detection signals from these detecting circuits 17, 18 are inputted to the CPU 1.

In the first to fourth embodiments, the timing when interelectrode resistance shifts from an upward tendency to an downward tendency (timing when the rate of change of resistance changes from plus to minus) is detected to know the timing when nugget begins to grow up.

Figure 13A:
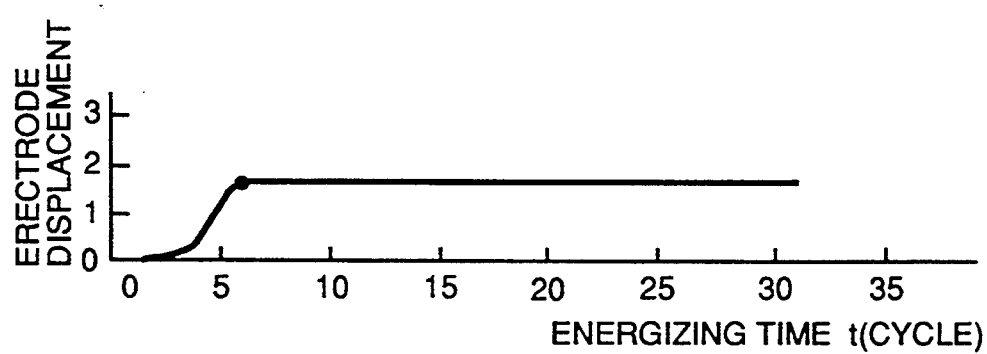
FIGS. 13(a) and 13(b) are graphs illustrating the operation of the fifth embodiment.
Figure 13B:
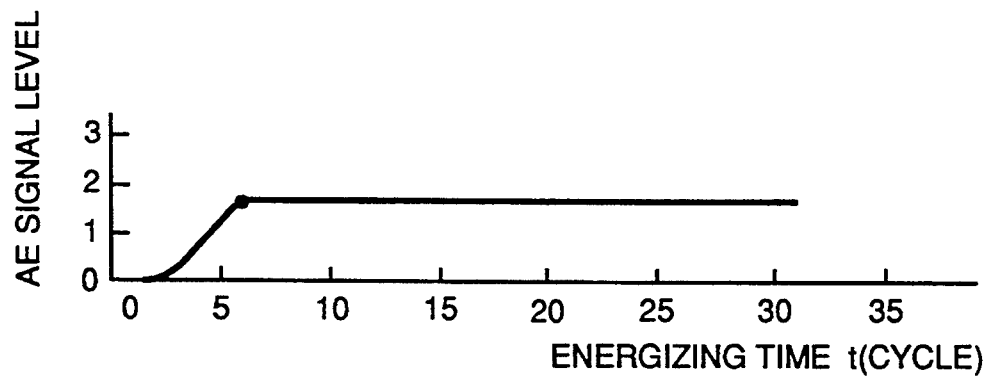

When nugget begins to grow up, resistance shifts from an upward tendency to a downward tendency, and the amount of displacement of the electrode becomes constant, as shown in FIG. 13(a). Further, as shown in FIG. 13(b), AE signal is kept at its maximum level. Thus, Step S8 may be replaced by a process of determining a point at which the rate of change of the amount of electrode displacement becomes substantially zero, or a process of determining a point at which the rate of change of AE signal becomes substantially zero to detecting the timing when nugget begins to grow up.

In this way, welding can be also executed with welding current and/or pinching force kept at values at the beginning of growth of nugget.

What is claimed is:

1. A controller for a welding machine in which workpieces are pinched between a pair of electrodes through which welding current is supplied to weld the workpieces, said controller comprising;

first means for detecting an amount of interelectrode resistance between the electrodes;

second means for monitoring the amount of interelectrode resistance between the electrodes and for detecting the occurrence of a phenomenon that the interelectrode resistance detected by the first means shifts from an upward tendency to a downward tendency;

third means for increasing welding current periodically until occurrence of the phenomenon is detected by the second means;

fourth means for maintaining welding current, after occurrence of the phenomenon, at a value present when occurrence of the phenomenon is detected by the second means; and fifth means for cutting off welding current after occurrence of the phenomenon is detected by the second means and when an absolute value of a time derivative of the interelectrode resistance detected by the first means becomes less than a predetermined value.

2. The controller for a welding machine as defined in claim 1, wherein the predetermined value is obtained by multiplying the maximum value of the time derivative of the interelectrode resistance by a predetermined ratio.

3. The controller for a welding machine as defined in claim 1, further comprising sixth means for detecting the occurrence of a phenomenon that the interelectrode resistance detected by the first means shifts from a downward tendency to an upward tendency;

wherein the welding current is increased by a large amount in each period until occurrence of the phenomenon that interelectrode resistance shifts from the downward tendency to the upward tendency; and wherein welding current is increased by a small amount in each period between occurrence of the phenomenon that interelectrode resistance shifts from the downward tendency to the upward tendency and occurrence of the phenomenon that interelectrode resistance shifts from the upward tendency to the downward tendency.

4. A controller for a welding machine in which workpieces are pinched between a pair of electrodes through which welding current is supplied to weld the workpieces, said controller comprising:

first means for detecting an amount of interelectrode resistance between the electrodes;

second means for monitoring the amount of interelectrode resistance between the electrodes and for detecting the occurrence of a phenomenon that the interelectrode resistance detected by the first means shifts from an upward tendency to a downward tendency;

third means for increasing pinching force periodically until occurrence of the phenomenon is detected by the second means;

fourth means for maintaining pinching force, after occurrence of the phenomenon, at a value present when occurrence of the phenomenon is detected by the second means; and fifth means for cutting off pinching force after occurrence of the phenomenon is detected by the second means and when an absolute value of a time derivative of the interelectrode resistance detected by the first means becomes less than a predetermined value.

5. The controller for a welding machine as defined in claim 4, herein the predetermined value is obtained by multiplying the maximum value of the time derivative of the interelectrode resistance by a predetermined ratio.

* * * * *